UNITED STATES PATENT OFFICE 2,166,151

CATALYTIC HYDROGENATION OF ADIPONITRILES TO PRODUCE HEXAMETHYLENE DIAMINES

Benjamin W. Howk, Wilmington, Del., assignor to E. I. du Pont de Nemours & Company, Wilmington, Del., a corporation of Delaware No Drawing. Application February 23, 1937, Serial No. 127,203

9 Claims. (Cl. 260—583)

This invention relates to catalytic processes and more particularly it relates to processes for the liquid phase catalytic hydrogenation of adiponitrile to hexamethylene-diamine.

This application is a continuation-in-part of my copending application Serial No. 49,973, filed November 15, 1935.

The literature contains many references to laborious and inefficient methods for the preparation of diamines. Among these, the sodium reduction of dinitriles, the hypochlorite degradation of diamides and the reaction of dihalides with ammonia might be mentioned as typical. Most of these processes involve the use of aqueous solutions, salts, etc. from which it is extremely difficult to isolate the diamines in pure form. My invention utilizes an economical hydrogenation process to form the diamine which is isolated in a very pure form by simple fractional distillation.

This invention has as an object the preparation of hexamethylene diamine. Another object is the preparation of hexamethyl diamine in high yields. Another object is the preparation of hexamethylene diamine from the dinitrile of adipic acid. Still onother object is the preparation of hexamethylene diamine by a process giving the raw product in a form that is easily purified. And another object is the preparation of hexamethylene diamine by catalytic hydrogenation. Other objects will appear hereinafter.

These objects are accomplished by means of the following invention which comprises catalytically hydrogenating the dinitrile of adipic acid in the liquid phase in the presence of ammonia at a temperature between 50° and 170° C. The process may be carried out as follows: First charge the dinitrile of adipic acid with or without a solvent together with a hydrogenation catalyst, such as nickel, and preferably with an excess of dry ammonia into an agitated autoclave capable of withstanding high pressures and temperatures; then admit hydrogen into the autoclave under pressure and heat the mixture to a temperature between 50° and 170° C. while stirring same. After the absorption of hydrogen ceases, discontinue the heating and stirring and recover the hexamethylene diamine from the product by a conventionel method such as distillation.

The following examples set forth certain well defined instances of the application of this invention. They are, however, not to be considered as limitations thereof since many modifications may be made without departing from the spirit and scope of this invention.

Example 1

Forty grams of adiponitrile, 150 cc. of methanol, 56 g. of anhydrous ammonia, and 5 grams of nickel catalyst are sealed in a small shaking autoclave. Hydrogen is forced into the autoclave until the total pressure is within the range from 1000 to 2000 pounds. The nitrile undergoes hydrogenation at a temperature of 95° to 100° C. and the reaction is complete in one hour. The main product of the reaction, which is best isolated by fractional distillation, is hexamethylene diamine, a white crystalline solid, m. p. 41° C., b. p. 90° to 92° C. at 14 mm. The yield of this diamine is 31 g., equivalent to a 72% conversion. Small quantities of hexamethylene imine, b. p. 136° to 138° C., and soluble high molecular weight amino compounds are obtained as by-products from the reaction.

Example 2

A high pressure autoclave equipped with a stirring device is charged with 7500 g. of adiponitrile, 5600 g. of ammonia and 450 g. of an active nickel hydrogenation catalyst. Hydrogen under pressure is admitted to the autoclave and the mixture heated to 120° C. Hydrogen is rapidly absorbed over a period of two hours, the total pressure being maintained within the range from 1500 to 2000 pounds per square inch by adding fresh amounts of hydrogen as needed from high pressure storage tanks. The autoclave is cooled, the charge taken up in warm methanol, and the mixture is filtered to separate the catalyst. Fractional distillation of the crude product gives 532 grams of hexamethylene imine, 6990 grams of hexamethylene diamine, and 386 grams of high boiling residue. The molecular conversion to hexamethylene diamine is 86.3% of theory.

Example 3

An active nickel hydrogenation catalyst suitable for the hydrogenation of adiponitrile to hexamethylene diamine is prepared by the following procedure: 35 g. of sodium metasilicate is dissolved in 875 cc. of water and the solution made barely acid by adding 22 cc. of concentrated nitric acid (73%). To this slightly acid silicate solution is added in succession 700 cc. of nickel nitrate solution containing 70 grams of nickel, and 140 grams of magnesia alba. The mixture is thoroughly stirred to produce a uniform suspension and 5600 cc. of 5% sodium bicarbonate solution is poured into it. The resulting slurry is coagulated by a few minutes boiling, after which it is filtered, washed, dried in an oven at 110° C. and finally calcined at 450° C. for several hours to form a fine, pale green powder. An extremely active hydrogenation catalyst is produced by heating this powder at 460° to 475° C. in a stream of reducing gas such as hydrogen. The elementary nickel in this catalyst exists in an extremely fine state of subdivision as indicated by its pyrophoric nature and activity in promoting hydrogenation reactions as illustrated in the following experiment:

One hundred grams of adiponitrile, 75 grams of ammonia and 10 grams of a nickel catalyst, prepared by the foregoing procedure, are charged into a small autoclave. Hydrogen is forced into the autoclave until the total pressure is within the range from 900 to 2500 pounds per square inch and the temperature raised to 100° C. Hydrogen is absorbed rapidly by the mixture, and it is necessary to admit fresh hydrogen from time to time in order to maintain a proper working pressure. The reaction is complete at the end of two hours. Thereafter the autoclave is cooled, the product dissolved in methanol and separated from the catalyst by filtration. Vacuum fractional distillation of the crude catalyst-free material gives 84.5 grams of pure hexamethylene diamine, boiling range 90° to 92° C. at 14 mm.

Example 4

Another type of nickel catalyst is made by a procedure somewhat as follows: 80 parts of 5% sodium bicarbonate solution is added to a suspension of 1.5 parts of natural, untreated kieselguhr in 22.5 parts of a solution containing 2 parts of nickel nitrate and 0.5 part of sodium silicate. Nickel carbonate admixed with some nickel silicate is precipitated on the surface of the kieselguhr. This mixture is filtered, washed, dried and the nickel salts reduced to elementary nickel by heating in a rapid stream of hydrogen at 460° to 475° C. over a period of two or three hours. The resulting catalyst powder is quite effective in promoting hydrogenation reactions and is particularly useful in the hydrogenation of adiponitrile to hexamethylene diamine as illustrated by the following example.

One hundred grams of adiponitrile, 75 grams of ammonia and 15 grams of the nickel-on-kieselguhr catalyst are sealed in a hydrogenation autoclave. The mixture is treated with hydrogen in accordance with the process of Example 2 at a temperature of 120° C. and under total pressures between 1200 and 2500 pounds per square inch. The absorption of hydrogen is complete in about 60 minutes. The autoclave is cooled, the product dissolved in methanol and filtered to remove the catalyst. Vacuum fractional distillation of the product yields 89.6 grams of pure hexamethylene diamine, a conversion of 83.5% based on the adiponitrile charged into the autoclave.

If, by way of contrast, a sample of adiponitrile is hydrogenated according to the above conditions except that the ammonia is omitted, only about ⅙ the theoretical amount of hydrogen is absorbed. Thereafter the pressure in the autoclave increases, indicating the formation of gaseous products. On working up the product there is obtained, in addition to unchanged adiponitrile, a small amount of hexamethylene imine and a substantial quantity of high boiling polymeric amines.

Example 5

One hundred grams of adiponitrile is hydrogenated in the presence of 75 grams of liquid ammonia and 8 grams of a finely divided elementary nickel hydrogenation catalyst at a temperature of 140° C. and under total pressure of about 2000 pounds per square inch. Hydrogen is absorbed over a period of about 1.75 hours. On working up the product according to the procedure of Example 2, there is obtained 91.7 grams of pure hexamethylene diamine. The yield is 85.4% of theory.

Although in the above examples I have indicated certain definite conditions of temperature, pressure, concentrations, times of reaction, catalysts, etc., it is to be understood that these values may be varied somewhat within the scope of this invention, since the conditions of each experiment are determined by the material under treatment and the catalyst employed. In general, the processes of this invention are operable within the temperature range from 50° to 170° C. and at pressures ranging from atmospheric to a maximum determined by the practical limitations of the vessel used in carrying out the reaction. It is advisable, however, to maintain a pressure higher and a temperature lower than the corresponding critical values for ammonia, in order to preserve that essential ingredient in the liquid phase. In this respect it might be noted that the vapor pressure of ammonia at 50° C. is 1500 mm. of mercury (19.75 atmospheres or 290 pounds per square inch). A pressure in excess of 290 pounds per square inch should therefore be used and for practical purposes a pressure within the range of from about 500 to about 4000 pounds per square inch is desirable. I prefer to operate at a temperature of 115° to 140° C. and under total pressures of 1200 to 2600 pounds per square inch. The quantity of ammonia used may be varied considerably but, since it is probable that it may react with the nitrile group prior to hydrogenation or after partial hydrogenation to an aldimine, it is preferable to use at least 23.6 parts by weight of ammonia per 100 parts by weight of adiponitrile. This amount is equal to equivalent quantities of each. I prefer that the ammonia concentration be within the range of from about 60 parts by weight to about 75 parts by weight of ammonia per 100 parts by weight of adiponitrile.

The type and amount of catalyst employed in this invention is determined by the kind of products desired. Pyrophoric or stabilized nickel catalysts, either in the massive state or supported on suitable powdered materials such as kieselguhr or pumice, are most effective in producing a rapid hydrogenation of nitriles with a maximum yield of primary amines. In this respect the hydrogenating metals selected from the group comprising the base metals of the 8th group of the Periodic Table are especially effective catalysts for this reaction. However, hydrogenation catalysts in general are operative in this process and I may use a hydrogenation catalyst comprising as its essential component a hydrogenating metal, oxide, or salt of platinum, copper, and silver, as well as the metals, oxides, and salts of the base metals of the 8th group of the Periodic Table. The compounds of zinc which are commonly used as hydrogenation catalysts are also operative in this process. These catalysts are, however, less active than nickel or the base metals of the 8th group of the Periodic Table, require a longer time of hydrogenation, and tend to produce a higher yield of secondary and tertiary amines.

The process may be carried out in the presence of an inert organic solvent such as an alcohol and ether or a hydrocarbon solvent. As examples of specific solvents one may use either methanol, dioxane, or toluene. I prefer, however, to carry out the reaction in the absence of solvents.

My invention offers many advantages over the prior art from the standpoint of economy and efficiency. It comprises a novel and effective catalytic hydrogenation process whereby adiponitrile is converted to the corresponding hexamethylene diamine with a minimum of undesirable side reactions such as the formation of cyclic imines or polymeric amines. The pure anhydrous hexamethylene diamine is recovered from the reaction mixture in high yields by a simple fractional distillation process. The use of ammonia in my process is especially advantageous since it contributes to the smoothness and completeness of the reaction, and tends to decrease the yield of undesirable by-products which are otherwise produced.

The diamine of this invention is of interest as a detergent, emulsifying agent and textile assistant intermediate, corrosion inhibitor, flotation agent, insecticide, etc. It may also be employed in the synthesis of polymeric amides, polymeric amino resins, and to modify other resins that are used in the manufacture of plastics, coating compositions and the like.

Since many apparently and widely different embodiments of this invention may be made without departing from the spirit and scope thereof, it is to be understood that I do not limit myself to the specific embodiments thereof, except as defined in the following appended claims.

I claim:

1. The process for the production of hexamethylene diamine which comprises catalytically hydrogenating adiponitrile in the liquid phase in the presence of ammonia.

2. The process for the production of hexamethylene diamine which comprises catalytically hydrogenating adiponitrile in the liquid phase in the presence of ammonia, at a pressure between about 1200 pounds per square inch and about 2600 pounds per square inch.

3. The process for the production of hexamethylene diamine which comprises treating with hydrogen adiponitrile in the liquid phase in the presence of ammonia and in the presence of a hydrogenation catalyst comprising as an essential component a member of the group consisting of the base metals of the 8th group of the Periodic Table, at a temperature between 50° and 170° C.

4. The process in accordance with claim 3 characterized in that the reaction is carried out at a temperature between 115° and 140° C.

5. The process in accordance with claim 3 characterized in that the reaction is carried out under a pressure in excess of about 500 pounds per square inch.

6. The process in accordance with claim 3 characterized in that the reaction is carried out at a temperature between about 115° and about 140° C. and at a pressure between about 1200 to about 2600 pounds per square inch.

7. The process in accordance with claim 3 characterized in that the ammonia is present in an amount equal to about 60 to about 75 parts by weight of ammonia per 100 parts by weight of adiponitrile.

8. The process for the production of hexamethylene diamine which comprises treating with hydrogen adiponitrile in the liquid phase in the presence of liquid ammonia and in the presence of a nickel hydrogenation catalyst, at a temperature between 50° and 170° C.

9. The process for the production of hexamethylene diamine which comprises treating with hydrogen adiponitrile in the liquid phase in the presence of ammonia and in the presence of a nickel hydrogenation catalyst, at a temperature between about 115° and about 140° C. and under a pressure between about 1200 pounds per square inch and about 2600 pounds per square inch, said ammonia being present in an amount of about 60 to about 75 parts by weight of ammonia per 100 parts by weight of adiponitrile.

BENJAMIN W. HOWK.